US008542849B2

(12) United States Patent
Bruey et al.

(10) Patent No.: US 8,542,849 B2
(45) Date of Patent: Sep. 24, 2013

(54) APPARATUS, METHOD, AND MANUFACTURE FOR CONNECTABLE GAIN-SHARING AUTOMIXERS

(75) Inventors: Douglas Christopher Bruey, Seattle, WA (US); Dana Lee Troxel, Marysville, WA (US)

(73) Assignee: Rane Corporation, Mukilteo, WA (US)

( * ) Notice: Subject to any disclaimer, the term of this patent is extended or adjusted under 35 U.S.C. 154(b) by 607 days.

(21) Appl. No.: 12/848,783

(22) Filed: Aug. 2, 2010

(65) Prior Publication Data

US 2012/0027229 A1 Feb. 2, 2012

(51) Int. Cl.
*H04B 1/00* (2006.01)

(52) U.S. Cl.
USPC ................................ 381/119; 381/107; 369/4

(58) Field of Classification Search
USPC .................. 381/119, 109, 106–107; 369/3–4
See application file for complete search history.

(56) References Cited

U.S. PATENT DOCUMENTS

| | | | | |
|---|---|---|---|---|
| 3,437,758 | A | 4/1969 | Clement | |
| 3,496,481 | A | 2/1970 | Torick et al. | |
| 3,538,254 | A | 11/1970 | Ancha | |
| 3,755,625 | A | 8/1973 | Maston | |
| 3,814,856 | A | 6/1974 | Dugan | |
| 3,992,584 | A | 11/1976 | Dugan | |
| 4,149,032 | A | 4/1979 | Peters | |
| 4,357,492 | A | 11/1982 | Campbell et al. | |
| 4,454,609 | A | 6/1984 | Kates | |
| 4,598,418 | A | 7/1986 | Griffith, Jr. et al. | |
| 4,712,231 | A | 12/1987 | Julstrom | |
| 4,864,627 | A | 9/1989 | Dugan | |
| 5,197,098 | A | 3/1993 | Drapeau | |
| 5,204,908 | A | 4/1993 | Sims | |
| 5,414,776 | A | 5/1995 | Sims, Jr. | |
| 5,652,800 | A | 7/1997 | Roberts | |
| 6,434,242 | B2 * | 8/2002 | Yamada et al. | 381/119 |
| 2005/0226444 | A1 * | 10/2005 | Coats | 381/119 |

OTHER PUBLICATIONS

Altec Lansing, "Models 1674 and 1678 Microphone Mixers," Operating Instructions, Anaheim, California, 2 pages, http://www.altecpro.com/products/vintage/index.htm#mixers (retrieved Nov. 5, 2010).

Altec Lansing, "Models 1674 and 1678 Microphone Mixers," Service Instructions, Anaheim, California, 12 pages, http://www.altecpro.com/products/vintage/index.htm#mixers (retrieved Nov. 5, 2010).

* cited by examiner

*Primary Examiner* — Disler Paul
(74) *Attorney, Agent, or Firm* — Frommer Lawrence & Haug LLP; Bruce E. Black

(57) ABSTRACT

A device for audio mixing includes a cascade input port and a first cascade input component that includes a first cascade input level detector component that detects an audio level of an upstream sum audio signal. The first cascade input port also includes an attenuator component that attenuates the first upstream mix audio signal by a gain corresponding to difference between the upstream sum audio signal value and a detected audio level of an input sum audio signal. The device also includes a summer component where the signals summed include at least the first upstream sum audio signal. The device also includes an input sum level detector component that detects the audio level of the input sum audio signal. The device also includes a mixer component that is configured to provide a mix output signal by summing, where the signals summed include at least the first attenuated upstream mix signal.

18 Claims, 4 Drawing Sheets

APPARATUS, METHOD, AND MANUFACTURE FOR CONNECTABLE GAIN-SHARING AUTOMIXERS

FIELD OF THE INVENTION

The invention is related to sound control systems, and in particular, to an apparatus, method, and manufacture for gain-sharing automixing of audio signals that allow the addition of more automixer inputs to the automixer by simply connecting one or more distributed gain-sharing automixers.

BACKGROUND OF THE INVENTION

An automixer is typically designed to balance multiple sound sources, usually microphones, based on the level of each source, attenuating inactive inputs. Automixers are typically used to mix panel discussions on television shows and at conferences and seminars. They can also be used to mix actors' wireless microphones in theater productions and musicals. They may be used in audio systems in churches, schools, hotels, convention centers, and the like. They are frequently employed in commercial sound systems such as in courtrooms and city council chambers where it is not expected that a live sound operator will be present to mix the microphones. When automixers are used in live sound reinforcement, they work to maintain a steady limit on the overall signal level of the microphones. If a public address system is set up so that one microphone will not feed back, then, in general, multiple microphones will not feed back if they are automixed.

Further, various gain-sharing strategies have been developed in which the signal level in a particular channel is compared with the sum of all the channels to compute a gain-sharing factor. The channel with the highest level input receives highest gain which is a proportional fraction of the total gain available. Additionally, gain-sharing strategies have been developed in which a proportional, multichannel gain-sharing audio circuit has a gain control in the computing leg so that additional weight may be accorded the channel so that the channel is allocated greater gain in proportion to the total amount of signal available to all of the channels combined.

BRIEF DESCRIPTION OF THE DRAWINGS

Non-limiting and non-exhaustive embodiments of the present invention are described with reference to the following drawings, in which.

DETAILED DESCRIPTION

Figure 1:
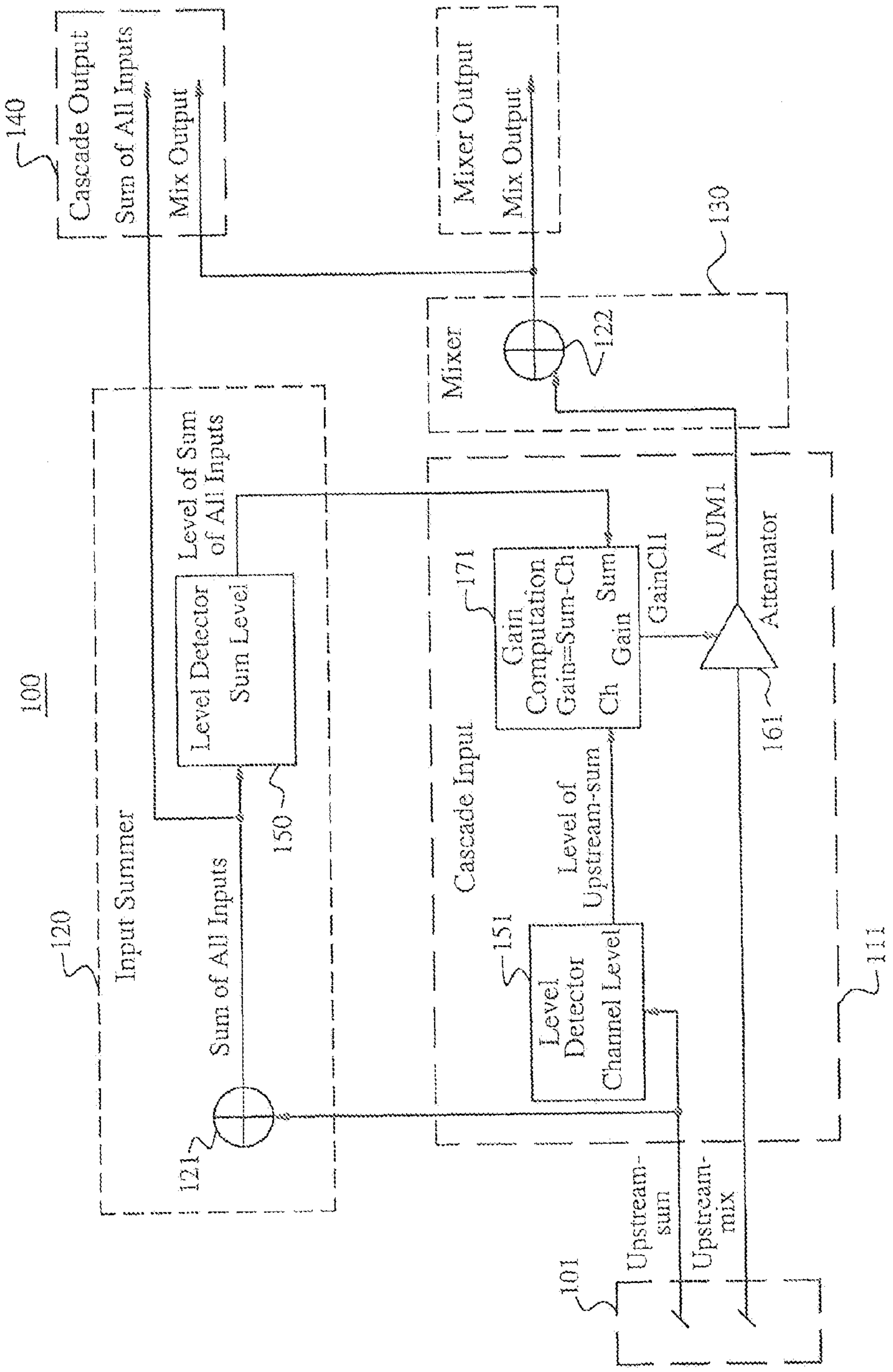
FIG. 1 illustrates a block diagram of an embodiment of an automixer.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, audio, or other signal.

Briefly stated, the invention is related to a device for audio mixing that includes a cascade input port and a first cascade input component that includes a first cascade input level detector component that detects an audio level of an upstream sum audio signal. The first cascade input port also includes an attenuator component that attenuates the first upstream mix audio signal by a gain corresponding to difference between the upstream sum audio signal value and a detected audio level of an input sum audio signal. The device also includes a summer component where the signals summed include at least the first upstream sum audio signal. The device also includes an input sum level detector component that detects the audio level of the input sum audio signal. The device also includes a mixer component that is configured to provide a mix output signal by summing, where the signals summed include at least the first attenuated upstream mix signal.

The automixer may accordingly act as a distributed gain-sharing automixer that enables the addition of more automixer inputs to an automixer by simply connecting one or more distributed gain-sharing automixers. This allows for distributing the inputs, outputs, and processing of a single, gain-sharing, automatic microphone mix across a number of different physical automixers. A variety of devices in accordance with embodiments of the invention may have various input, output, and processing capabilities that may be connected together to produce an automatic mix of the microphone inputs on all interconnected products, and the devices may be used to build audio systems of various sizes (inputs, outputs, processing) that include gain-sharing automatic microphone mixing.

FIG. 1 illustrates a block diagram of an embodiment of automixer 100, which may include cascade input port 101, cascade input component 111, input summer component 120, and mixer component 130. Cascade input component 111 includes cascade input level detector component 151, attenuator component 161, and cascade gain computation component 171. Input summer component 120 includes summer component 121 and input sum level detector component 150. Mixer component 130 includes summer component 122.

Cascade input port 101 is configured to receive a first upstream sum audio signal Upstream-sum and a first upstream mix audio signal Upstream-mix. These signals, when present, are generated from another automixer, which may be substantially similar to automixer 100 of FIG. 1 or automixer 200 of FIG. 2.

Figure 2:
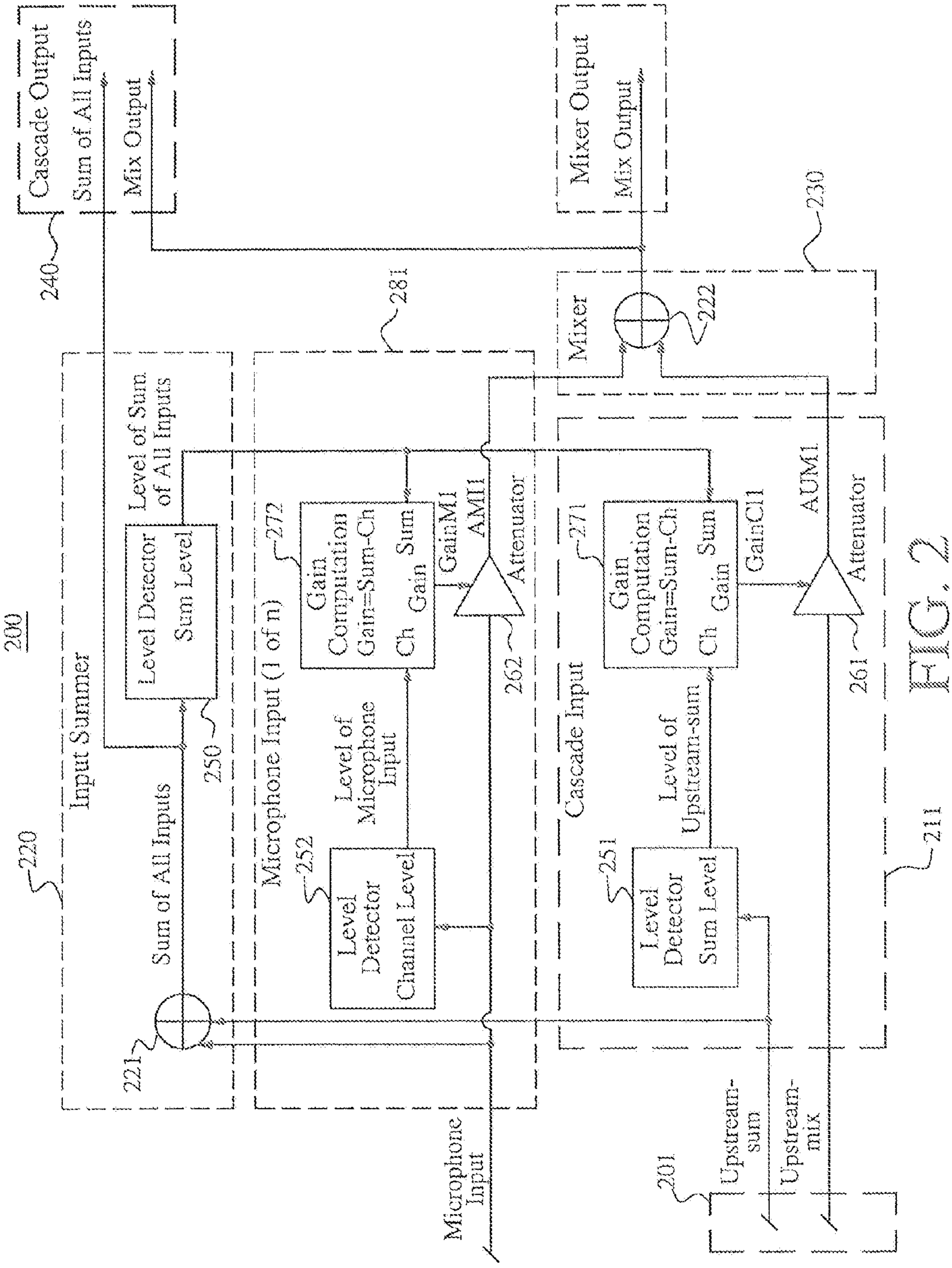
FIG. 2 shows a block diagram of an embodiment of the automixer of FIG. 1.
Figure 3:
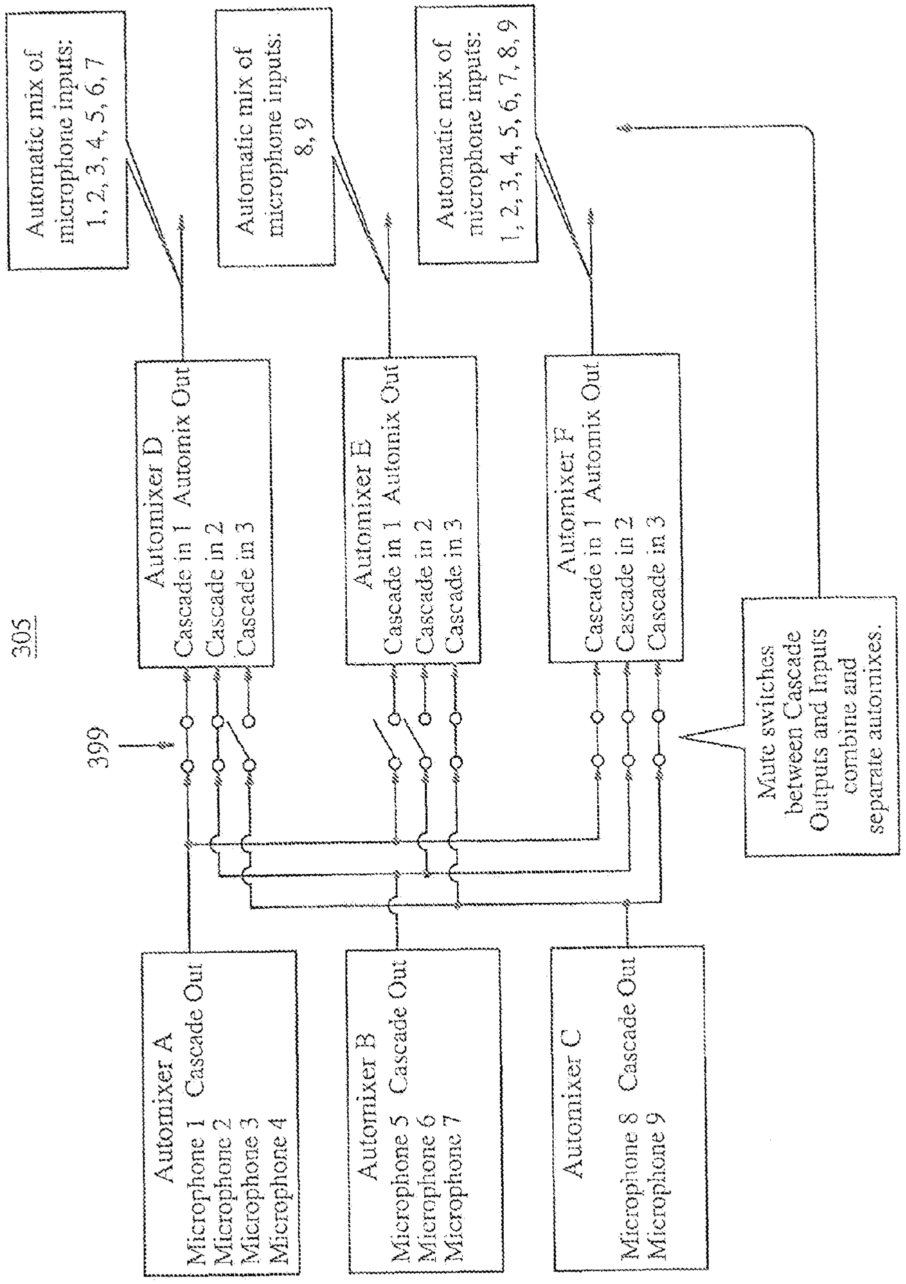
FIG. 3 illustrates a block diagram of an embodiment of a system that includes automixers that are embodiments of the automixer of FIG. 1 or FIG. 2.

FIG. 1 illustrates one cascade input for automixer 100. Automixer 100 has at least two inputs, which may include two or more cascade inputs, two or more microphone inputs, or at least one cascade input and at least one microphone input. FIG. 1 shows only a single cascade input, because the additional input(s) may be either at least one additional cascade input, at least one microphone input, or both. FIG. 2 shows an automixer with any number of microphone inputs and any number of cascade inputs. FIG. 1 shows a simple embodiment with only one cascade input actually shown in the figure, with further inputs unspecified. Accordingly, automixer 100 may have one cascade input, and one or more additional inputs (cascade, microphone, or both). Alternatively, other embodiments of automixer 100 may have two or more microphone inputs, and no cascade inputs (but having a cascade output). For examples, Automixer A, B, and C of FIG. 3 are embodiments of automixer 100 that each have multiple microphone inputs, no cascade inputs, and each have a cascade output.

Input level detector component 151 is configured to provide a detected value (shown as "Level of Upstream-sum" in FIG. 1) corresponding to an audio level of Upstream-sum. Cascade gain computation component 171 is configured to provide a first cascade gain value, GainCI1, corresponding to a difference between the value of the detected audio level of signal Upstream-sum ("Level of Upstream-sum") and an input sum level value (shown in FIG. 1 as "Level of Sum of All Inputs"). Attenuator component 161 is configured to provide a first attenuated upstream mix signal AUM1 by attenuating first upstream mix audio signal Upstream-mix based on first cascade gain value GainCI1.

Summer component 121 is configured to provide an input sum audio signal (shown as "Sum of All Inputs" in FIG. 1) by summing together each signal provided as an input to the summer component, where at least first upstream sum audio signal Upstream-sum is provided as an input to the summer component. Input sum level detector component 150 is configured to provide the input sum level value ("Level of Sum of All Inputs") corresponding to an audio level of the input sum audio signal. Mixer component 130 is configured to provide mix output signal Mix Output by summing together each signal provided as an input to the mixer component, where at least first attenuated upstream mix signal AUM1 is provided as an input to the mixer component.

FIG. 2 shows a block diagram of an embodiment of automixer 200, which may be employed as an embodiment of automixer 100 of FIG. 1. Automixer 200 is similar to automixer 100 of FIG. 1, but it includes n microphone inputs and m cascade inputs, where n and m are both integers, n is greater than or equal to zero, m is greater than or equal to zero, and the sum of n+m is greater than or equal to 2.

Each cascade input component (e.g., 211) operates in a substantially similar manner as discussed above with regard to cascade input component 111 of FIG. 1, with each separate cascade input component receiving a separate Upstream-sum signal, receiving a separate Upstream-mix signal, and providing a different attenuated Upstream-mix signal (AUM1-AUMm).

Microphone input 281 is configured to receive microphone input audio signal Microphone Input. A microphone audio input is any audio signal input to automixer 200 that is not the output of an upstream automixer and for which gain-sharing is to be performed. Typically the input is from a microphone, but the invention is not so limited, and as stated the "microphone" input may be an audio input that is not the output of an upstream automixer for which gain-sharing is to be performed. First microphone input level detector component 252 is configured to provide a detected value (shown as "Level of Microphone Input" in FIG. 2) corresponding to an audio level of Microphone Input. First microphone gain computation component 272 is configured to provide a first microphone gain value (GainM1) corresponding to a difference between Level of Microphone Input and Level of Sum of All Inputs. First microphone attenuation component 262 is configured to provide first attenuated microphone input signal AMI1 by attenuating Microphone Input based on GainM1.

Each of the n microphone inputs is configured to operate in a substantially similar manner as discussed above with regard to microphone input 281, with each separate microphone input receiving a separate microphone input audio signal, and providing a separate attenuated microphone input signal (AMI1-AMIn).

Input summer component 221 is configured to provide the input sum audio signal ("Sum of All Inputs") by summing together each of the n Microphone Input signals and each of the m Upstream-sum signals. Mixer component 230 is configured to provide signal Mix Output by summing together each of the m attenuated upstream signals AUM1-AUMm and each of the n attenuated microphone input signals MI1-MIn. The cascade output signal Cascade Output includes two audio signals: Mix Output and the input sum audio signal. The cascade output signal may be routed to the cascade input of another automixer 200.

In some embodiments, each of the level detector components (e.g., 250, 251, and 252) is configured to monitor an audio signal and continually provide a value representing the level of the monitored audio signal in dB. In some embodiments, the root mean square (gins) value of the audio level is detected over a continuous rolling time window on the order of about 20 ms and a corresponding value is provided as the level of the monitored audio signal in dB. In other embodiments, other mathematical relationships and/or other time periods may be employed. The units of the audio level are not relevant—if signal Upstream-sum is an analog signal having a voltage that is proportional to the corresponding acoustical pressure of the sound produced if the audio signal were used to drive a speaker, then input level detector component 151 detects voltage (e.g., rms voltage); if signal Upstream-sum is a digital signal, input level detector component 151 detects the digital value (e.g., the rms of the digital value) representing the audio level. In some embodiments, each gain computation component (e.g. 271 and 272) provides a value representing the difference in dB between the outputs of two level detector components.

In some embodiments of automixer 200, microphone input audio signals are acquired via microphone preamplifiers and analog to digital converters, before entering a 32-bit, floating-point, digital signal processor (DSP). In some embodiments, the cascade input audio signals enter via a stereo digital audio input port encoded as a stream of uncompressed, 32-bit, audio samples represented as floating-point values. In some embodiments, each of the level detector components, gain computation components, attenuation components, and summer components are implemented in the floating-point DSP. In some embodiments, the audio signals of the cascade output are output from automixer 200 via a stereo digital audio output port, encoded as a stream of uncompressed, 32-bit, audio samples represented as floating-point values.

In some embodiments of automixer 200, the uncompressed digital audio of the cascade output and cascade input are encoded as streams of uncompressed, two's complement, 24-bit, fixed-point values, encoded using the Audio Engineering Society 3 (AES3) standard for digital audio input-output interfacing. This implementation allows the designer to leverage the built-in features of the floating-point DSP that expects data entering over synchronous serial audio ports to be represented as two's complement, 24-bit, fixed point values.

In some embodiments, some or all the components of automixer 200 (e.g., level detector components, gain computation components, attenuation components, and summer components) may be implemented using analog electronics instead of a DSP. For example, summing components as well as the gain computation components can be implemented by a summing amplifier such as an op amp summing circuit, or the like; and/or the attenuator components may be implemented with a voltage controlled amplifier, and/or the like. For example, in one embodiment, attenuation component 261 of FIG. 2 may be implemented by a voltage controlled amplifier that is arranged to receive signal Upstream-sum at an input of the voltage controlled amplifier, to receive GainCI1 at a gain input of the voltage-controlled amplifier, and to provide the signal AUM1 at the output of the voltage controlled amplifier Various embodiments of automixer 200 may be entirely encoded in a digital signal processor, and/or encoded as processor executable code stored in processor-executable memory together with one or more processors arranged to execute the software, may be all analog components, or may be some combination of hardware components and software components stored in memory to be executed by one or more processors in automixer 200. Processor-readable code may be encoded on a processor readable medium for performing the actions of automixer 200 when executed by one or more processors.

Automixer 200 enables the addition of more automixer inputs by simply connecting one or more automixers 200. Each distributed automixer 200 accepts audio inputs, such as microphone inputs, cascade inputs from the cascade outputs of other distributed automixers 200, and/or the like. The group of distributed automixers accepts audio inputs, such as microphone inputs, and mixes together the audio from those inputs via a gain-sharing algorithm. Using a gain-sharing automatic mixing algorithm provides several benefits. First, the algorithm produces a mix that has a constant gain from all inputs to the output. When the gain of the system is constant, an operator can create a public address system in which the acoustic gain is constant, and equal to the Needed Acoustic Gain (NAG). In such a system, the Feedback Stability Margin (FSM) may be maximized, and remains constant regardless of the number of microphones. Also, in a system where background noise is detected evenly by all microphones, a gain-sharing algorithm produces a constant level of background noise at the mix output regardless of the number of microphones or their input signal levels. In other words, the gain-sharing algorithm produces no gating, pumping, or breathing effects in the reinforced background noise of the public address system. A gain-sharing algorithm also reduces the comb filtering effect produced by two or more microphones detecting the same acoustic signal. Using automixer 200 for distributing a gain-sharing automix across multiple devices, the gain-sharing algorithm and all of its benefits are preserved even though the mixing and inputs are shared among various physical devices.

Automixer 200 enables a method for distributing a gain-sharing automatic mix across a variety of series connected devices by sending the resulting automatic mix (mix(n−1)) and the sum of all inputs (sum(n−1)) from one mixer (mixer (n−1)) to the next mixer in the series (mixer(n)) where sum (n−1) is summed with all other inputs of mixer(n) to create a new sum(n). Mixer(n) then attenuates the signal mix(n−1) by the relative difference in dB between sum(n) and sum(n−1), before mixing it with the other mixer(n) inputs which have been attenuated by the difference in dB between their levels and the level of sum(n), producing the new output mix(n). Mix(n) and sum(n) may be sent to mixer(n+1) and so on. The result is a gain-sharing automatic mix(n) at the output of any mixer(n) that includes all inputs from mixer(0) to mixer(n).

Distributing the inputs and processing of automixer 200 allows the series combination of an arbitrary number of gain-sharing automixers that each produce a gain-sharing automix at each automixer's output of all inputs up to and including that automixer's. For example, in a system with three automixers 200 connected in series, audio flows from Mixer1 to Mixer2 to Mixer3. Connecting three automixers 200 in series may be accomplished by connecting the cascade output of Mixer1 to the cascade input of Mixer2, and connecting the cascade output of Mixer2 to the cascade input of Mixer3. Mixer1's output is a gain-sharing mix of its inputs. Mixer2's output is a gain-sharing mix of the inputs on Mixer1 and Mixer2. Mixer3's output is a gain-sharing mix of the inputs on Mixer1, Mixer2, and Mixer3. The processing required in any one automixer 200 does not change with the addition of more automixers 200 in the series chain. Also, in some embodiments, the series interconnect between each automixer consists of two audio channels regardless of the number of automixers in the chain. Further, there is no master/slave relationship between automixers 200. Further, the gain computation for each microphone input does not require each microphone input to know the level in dB of the sum of all inputs on all automixers, and accordingly there is no need for a signal that flows back up the series chain from the last device representing the level of the sum of all inputs, and standard methods of stereo interconnect may be used for interconnecting the automixers 200 in the system.

Some embodiments of automixer 200 contain more than one cascade input. As automixers 200 are interconnected in topologies other than a simple daisy-chain, it remains true that the output of any automixer 200 is a gain-sharing automix of all mixer microphone inputs and upstream microphone inputs. The cascade input and cascade outputs are used to distribute the gain-sharing automixes across multiple devices in each topology. The Mix Output of any automixer in the system is a gain-sharing automix of all the mixer input and upstream inputs that is independent of downstream inputs. Virtually any topology of devices may be used—however a ring topology should not be employed—the cascade output of one automixer 200 may be used as the cascade input of any other automixer 200 unless that automixer 200 is already upstream, i.e., audio signals from that automixer 200 are already included as part of the gain-sharing mix of the automixer 200.

Various embodiments of automixer 200 may be employed as a variety of devices with gain-sharing automatic mixing capability that may be combined to create larger systems. Further, the processing capability of each product may be designed without concern for the number or type of distributed automixers 200. The various automixers 200 can use simple, low-cost, off-the-shelf solutions for stereo digital audio distribution to implement the series automixer interconnect between products. Further, use of automixers 200 simplifies the installation of interconnected products because the installer does not need to specify a master device.

The output of a system of distributed automixers 200 is the same result as if all of the inputs were provided to a single automixer 200, as illustrated by the following examples.

If a four input automixer has all four inputs driven with non-coherent 10 dBu signals, the sum of all these inputs has an rms level of 16 dBu. According to the gain-sharing equation, each input must be attenuated by the difference in dB between its level and the level of the sum (6 dB). Accordingly, each input is attenuated by 6 dB, and then they are mixed together to produce the output of the automixer.

If the same inputs were provided to two distributed automixers 200 connected together, with two 10 dBu inputs to each automixer 200, the upstream mixer sums the two microphone inputs and its unused cascade input, resulting in an Upstream-sum signal with an rms level of 13 dBu. Each microphone input is attenuated by 3 dB and the resulting mix is present at the automixer's output. Signals Upstream-sum and Upstream-mix are sent to the downstream automixer via standard stereo audio interconnect. The downstream automixer sums its two microphone inputs and its cascade input's Upstream-sum signal to produce a sum of all inputs with an rms level equal to 16 dBu. Each microphone input is attenuated by 6 dB, and signal Upstream-mix is attenuated by 3 dB. The three attenuated signals are mixed together to create the downstream automixer's output. The output mix of the downstream automixer includes all four inputs, each attenuated by 6 dB as required by the gain-sharing algorithm. The upstream microphone inputs were attenuated by 3 dB in the upstream automixer and 3 dB at the cascade input to the downstream automixer, while the downstream microphone inputs were attenuated by 6 dB in the downstream automixer. Further, the output of the upstream automixer is an accurate gain-sharing mix of its two inputs that is unaffected by downstream inputs. Also, as previously discussed, there is no need for an interconnect or user controls required to send the level of the sum of all inputs back up stream, which enables the use of standard stereo audio interconnect to connect the cascade output of the upstream automixer to the cascade input of the downstream automixer.

In some embodiments, microphone inputs within a single system may be partitioned into groups that may be combined or separated into different gain-sharing mixes. In such a system, several automixers 200 with microphone and/or cascade inputs may be used to collect inputs from the system. The cascade outputs of these automixers may be routed to the inputs of one or more downstream automixers 200 that have only cascade inputs. The inputs of upstream automixers 200 may be combined into gain-sharing mixes at the output of the downstream automixers 200 in different configurations by muting signals Upstream-sum and Upstream-mix signals at the cascade input to the downstream automixer. One example of such a system is illustrated in FIG. 3 below.

FIG. 3 illustrates a block diagram of an embodiment of system 305, which includes automixers A-F and mute switches 399, where each of the automixers A-F may be an embodiment of automixer 100 of FIG. 1 or automixer 200 of FIG. 2.

As shown, Automixer A is used for receiving microphone inputs 1-4, Automixer B is used for receiving microphone inputs 5-7, and automixer C is used for receiving microphone inputs 8 and 9. The cascade outputs of Automixers A-C are coupled via mute switches to the cascade inputs of Automixers D-F to selectively provide different automatic mixes of the microphone, including the possibility of achieving an automatic mix of all of the microphone inputs.

Figure 4:
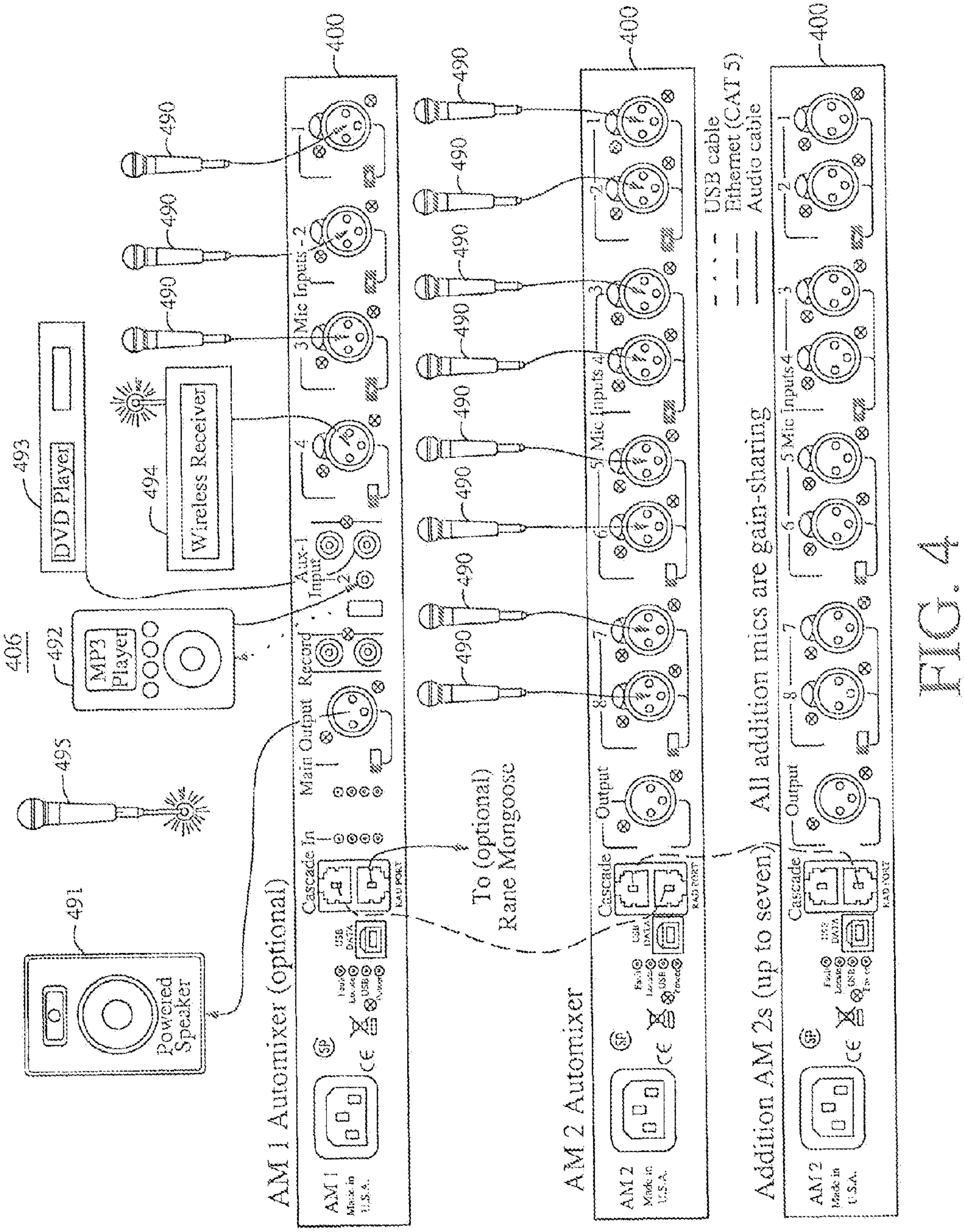
FIG. 4 shows a block diagram of an embodiment of a system that includes an embodiment of the automixer of FIG. 1 or FIG. 2, arranged in accordance with aspects of the invention.

FIG. 4 shows a block diagram of an embodiment of system 406. System 406 includes two or more automixers 400, which may each be an embodiment of automixer 100 of FIG. 1 or automixer 200 of FIG. 2, as well as various peripheral components. The peripheral components may include wired microphones 490, MP3 player 492, DVD player 493, wireless receive 494, wireless microphone 495, and/or the like. As shown, in some embodiments, a variety of audio sources may be used, with gain-sharing performed for microphone inputs, including wired microphones 490 and wireless microphones 495, which may be connected by wireless receivers in some embodiments. The mix output of any of the automixers 400 may be provided to a speaker, such as powered speaker 491, for outputting the mixed audio signal from the speaker.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A device for audio mixing, comprising:

an input port that is arranged to receive at least a first audio signal;

a first input component, including:

a first input level detector component that is configured to provide a detected value;

a first gain computation component that is configured to provide a first gain value corresponding to a difference between the detected value and an input sum level value; and an attenuator component that is configured to provide a first attenuated input audio signal by attenuating the input audio signal based on the first gain value;

a summer component that is configured to provide an input sum audio signal by summing together each signal provided as an input to the summer component, wherein at least the first audio signal is provided as an input to the summer component;

an input sum level detector component that is configured to provide the input sum level value corresponding to an audio level of the input sum audio signal;

a mixer component that is configured to provide a mix output signal by summing together each signal provided as an input to the mixer component, wherein at least the first attenuated input audio signal is provided as an input to the mixer component; and a first output component this is configured to provide the input sum audio signal as a first output and the mix output signal as a second output.

2. A device for audio mixing, comprising:

a cascade input port that is configured to receive a first upstream sum audio signal and a first upstream mix audio signal;

a first cascade input component, including:

a first cascade input level detector component that is configured to provide an upstream sum level value corresponding to an audio level of the first upstream sum audio signal;

a first cascade gain computation component that is configured to provide a first cascade gain value corresponding to a difference between the upstream sum level value and an input sum level value; and a first cascade attenuator component that is configured to provide a first attenuated upstream mix signal by attenuating the first upstream mix audio signal based on the first cascade gain value, a summer component that is configured to provide an input sum audio signal by summing together each signal provided as an input to the summer component, wherein at least the first upstream sum audio signal is provided as an input to the summer component;

an input sum level detector component that is configured to provide the input sum level value corresponding to an audio level of the input sum audio signal; and a mixer component that is configured to provide a mix output signal by summing together each signal provided as an input to the mixer component, wherein at least the first attenuated upstream mix signal is provided as an input to the mixer component.

3. The device of claim 2, wherein the first cascade input level detector component is configured to provide the upstream sum level value such that the audio level of the first upstream sum audio signal is a root mean square audio level of the first upstream sum audio signal, and wherein the input sum level detector component is configured to provide the input sum level such that the audio level of the input sum audio signal is the root mean square audio level of the input sum audio signal.

4. The device of claim 2, wherein the device further includes a digital signal processor, and wherein the digital signal processor includes the first cascade input component, the summer component, the input sum level detector component, and the mixer component.

5. The device of claim 2, wherein the first cascade attenuator component is a voltage controlled amplifier having a first input, a gain input, and an output, wherein the voltage controlled amplifier is arranged to receive the first upstream mix audio signal at the input of the voltage controlled amplifier, to receive the first cascade gain value at the gain input of the voltage-controlled amplifier, and to provide the first attenuated upstream mix signal at the output of the voltage controlled amplifier.

6. The device of claim 2, further comprising;

a second cascade input component, including:

a second cascade input level detector component that is configured to provide a second upstream sum level value corresponding to an audio level of a second upstream sum audio signal, wherein the second upstream sum audio signal is also provided as an input to the summer component;

a second cascade gain computation component that is configured to provide a second cascade gain value corresponding to a difference between the second upstream sum level value and the input sum level value; and a second cascade attenuator component that is configured to provide a second attenuated upstream mix signal by attenuating a second upstream mix audio signal based on the second cascade gain value, wherein the second attenuated upstream mix signal is also provided as an input to the mixer component.

7. The device of claim 2, further comprising:

a first microphone input component, including:

a first microphone input level detector component that is configured to provide a first microphone input level value corresponding to an audio level of a first microphone input audio signal, wherein the first microphone input audio signal is also provided as an input to the summer component;

a first microphone gain computation component that is configured to provide a first microphone gain value corresponding to a difference between the first microphone input level value and the input sum level value; and a first microphone attenuator component that is configured to provide a first attenuated microphone input signal by attenuating the first microphone input audio signal based on the first microphone gain value, wherein the first attenuated microphone input signal is also provided as an input to the mixer component.

8. The device of claim 7, further comprising:

a second microphone input component, including:

a second microphone input level detector component that is configured to provide a second microphone input level value corresponding to an audio level of a second microphone input audio signal, wherein the second microphone input audio signal is also provided as an input to the summer component;

a second microphone gain computation component that is configured to provide a second microphone gain value corresponding to a difference between the second microphone input level value and the input sum level value; and a second microphone attenuator component that is configured to provide a second attenuated microphone input signal by attenuating the second microphone input audio signal based on the second microphone gain value, wherein the second attenuated microphone input signal is also provided as an input to the mixer component.

9. A method for audio mixing, comprising:

providing an upstream sum level value corresponding to an audio level of a first upstream sum audio signal;

providing a first cascade gain value corresponding to a difference between the upstream sum level value and an input sum level value;

providing a first attenuated upstream mix signal by attenuating a first upstream mix audio signal based on the first cascade gain value;

providing an input sum audio signal by summing together a plurality of summing input signals, wherein the plurality of summing input signals include at least the first upstream sum audio signal;

providing the input sum level value corresponding to an audio level of the input sum audio signal; and providing a mix output signal by summing together a plurality of mixer input signals, wherein the plurality of mixer input signals include at least the first attenuated upstream mix signal.

10. The method of claim 9, wherein providing the upstream sum level value is accomplished such that the audio level of the first upstream sum audio signal is a root mean square audio level of the first upstream sum audio signal, and wherein providing the input sum level is accomplished such that the audio level of the input sum audio signal is the root mean square audio level of the input sum audio signal.

11. The method of claim 9, further comprising:

providing a second upstream sum level value corresponding to an audio level of a second upstream sum audio signal, wherein the plurality of summing input signals further include at least the second upstream sum audio signal;

providing a second cascade gain value corresponding to a difference between the second upstream sum level value and the input sum level value; and providing a second attenuated upstream mix signal by attenuating a second upstream mix audio signal based on the second cascade gain value, wherein the plurality of mixer input signals further include at least the second attenuated upstream mix signal.

12. The method of claim 9, further comprising:

providing a first microphone input level value corresponding to an audio level of a first microphone input audio signal, wherein the plurality of summing input signals further include at least the first microphone input audio signal;

providing a first microphone gain value corresponding to a difference between the first microphone input level value and the input sum level value; and providing a first attenuated microphone input signal by attenuating the first microphone input audio signal based on the first microphone gain value, wherein the plurality of mixer input signals further include at least the first attenuated microphone input signal.

13. The method of claim 12, further comprising;

providing a second microphone input level value corresponding to an audio level of a second microphone input audio signal, wherein the plurality of summing input signals further include at least the second microphone input audio signal; and providing a second microphone gain value corresponding to a difference between the second microphone input level value and the input sum level value; and providing a second attenuated microphone input signal by attenuating the second microphone input audio signal based on the second microphone gain value, wherein the plurality of mixer input signals further include the second attenuated microphone input signal.

14. A manufacture including a processor-readable medium having processor-executable code encoded therein, which when executed by one or more processors, enables actions for audio mixing, comprising:

providing an upstream sum level value corresponding to an audio level of a first upstream sum audio signal;

providing a first cascade gain value corresponding to a difference between the upstream sum level value and an input sum level value;

providing a first attenuated upstream mix signal by attenuating a first upstream mix audio signal based on the first cascade gain value;

providing an input sum audio signal by summing together a plurality of summing input signals, wherein the plurality of summing input signals include at least the first upstream sum audio signal;

providing the input sum level value corresponding to an audio level of the input sum audio signal; and providing a mix output signal by summing together a plurality of mixer input signals, wherein the plurality of mixer input signals include at least the first attenuated upstream mix signal.

15. The manufacture of claim 14, wherein the enabled actions further include:

providing a second upstream sum level value corresponding to an audio level of a second upstream sum audio signal, wherein the plurality of summing input signals further include at least the second upstream sum audio signal;

providing a second cascade gain value corresponding to a difference between the second upstream sum level value and the input sum level value; and providing a second attenuated upstream mix signal by attenuating a second upstream mix audio signal based on the second cascade gain value, wherein the plurality of mixer input signals further include at least the second attenuated upstream mix signal

16. The manufacture of claim 14, wherein the enabled actions further include:

providing a first microphone input level value corresponding to an audio level of a first microphone input audio signal, wherein the plurality of summing input signals further include at least the first microphone input audio signal;

providing a first microphone gain value corresponding to a difference between the first microphone input level value and the input sum level value; and providing a first attenuated microphone input signal by attenuating the first microphone input audio signal based on the first microphone gain value, wherein the plurality of mixer input signals further include at least the first attenuated microphone input signal,

17. The manufacture of claim 16, wherein the enabled actions further include:

providing a second microphone input level value corresponding to an audio level of a second microphone input audio signal, wherein the plurality of summing input signals further include at least the second microphone input audio signal; and providing a second microphone gain value corresponding to a difference between the second microphone input level value and the input sum level value; and providing a second attenuated microphone input signal by attenuating the second microphone input audio signal based on the second microphone gain value, wherein the plurality of mixer input signals further include the second attenuated microphone input signal.

18. A system for audio mixing, comprising:

a first automixer having at least a cascade output port; and a second automixer, including:

a cascade input port that is arranged to receive a first upstream sum audio signal and a first upstream mix audio signal from the cascade output port of the first automixer;

a first cascade input component, including:

a first cascade input level detector component that is configured to provide an upstream sum level value corresponding to an audio level of the first upstream sum audio signal;

a first cascade gain computation component that is configured to provide a first cascade gain value corresponding to a difference between the first upstream sum level value and an input sum level value; and a first cascade attenuator component that is configured to provide a first attenuated upstream mix signal by attenuating the first upstream mix audio signal based on the first cascade gain value;

a summer component that is configured to provide an input sum audio signal by summing together each signal provided as an input to the summer component, wherein at least the first upstream sum audio signal is provided as an input to the summer component;

an input sum level detector component that is configured to provide the input sum level value corresponding to an audio level of the input sum audio signal; and a mixer component that is configured to provide a mix output signal by summing together each signal provided as an input to the mixer component, wherein at least the first attenuated upstream mix signal is provided as an input to the mixer component.

* * * * *